Figure 1:
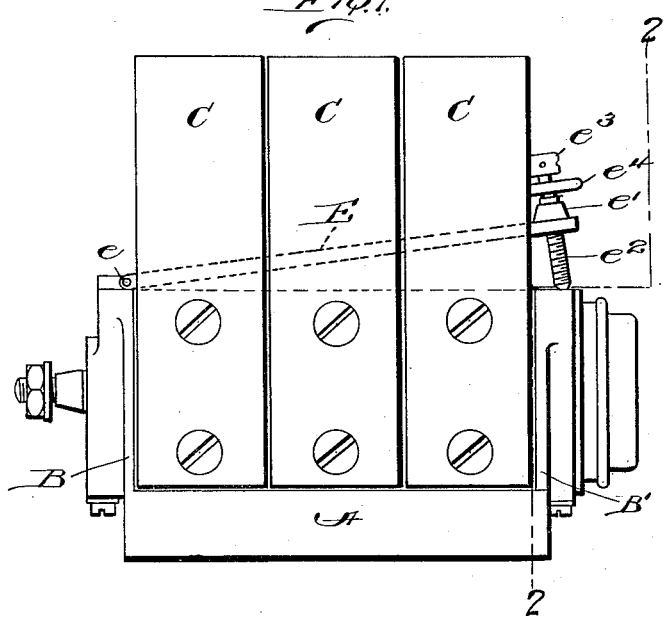

O. H. H. HEINS.
MAGNETO GENERATOR.
APPLICATION FILED MAR. 9, 1909.

1,140,155.

Patented May 18, 1915.
3 SHEETS—SHEET 1.

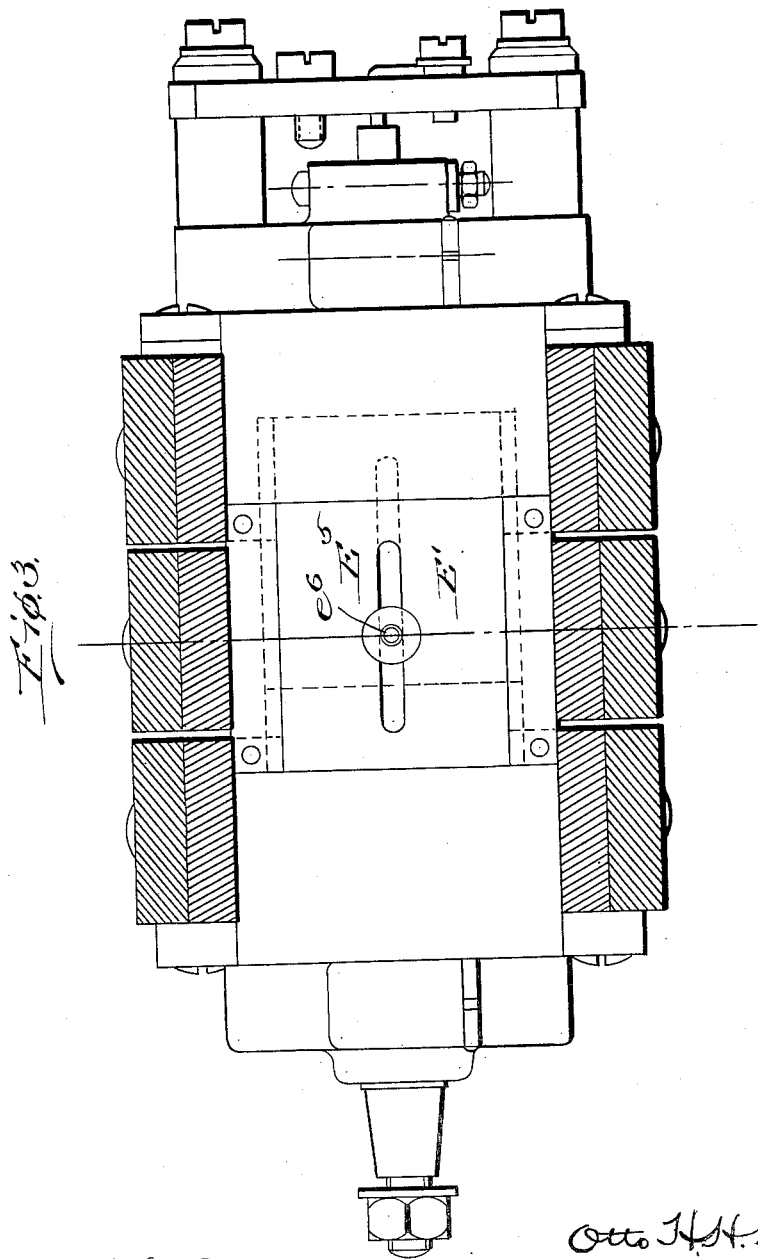

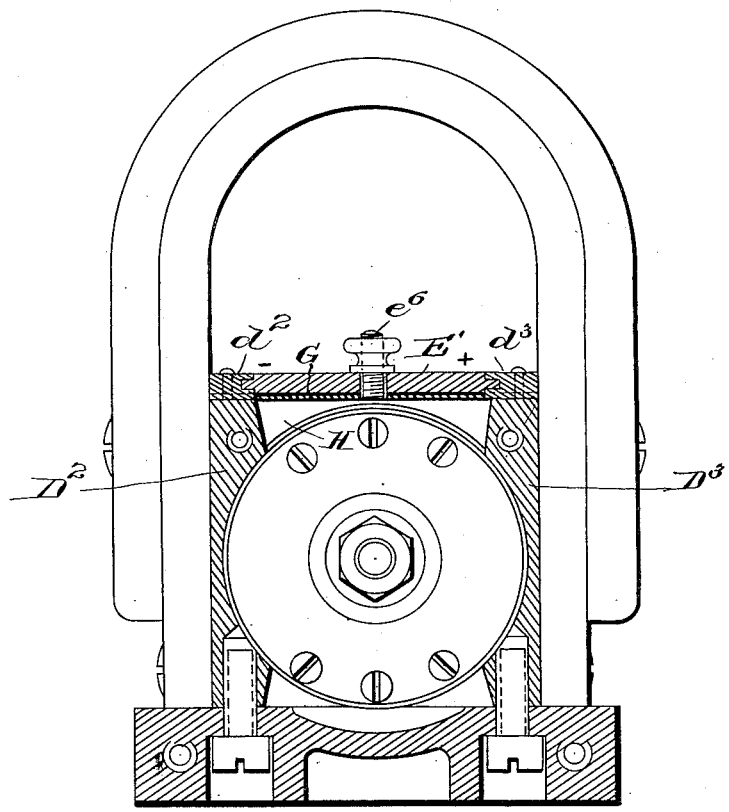

UNITED STATES PATENT OFFICE.

OTTO H. H. HEINS, OF EDGEWATER-ON-HUDSON, NEW JERSEY.

MAGNETO-GENERATOR.

1,140,155.  Specification of Letters Patent.  Patented May 18, 1915.

Application filed March 9, 1909. Serial No. 482,358.

*To all whom it may concern:*

Be it known that I, OTTO H. H. HEINS, citizen of the German Empire, residing at Valley Place, Edgewater-on-Hudson, New Jersey, have invented certain new and useful Improvements in Magneto-Generators; and I do hereby declare the following to be a full, clear, and exact description of the invention, such as will enable others skilled in the art to which it appertains, to make and use the same.

My invention relates to improvements in magneto-generators, that is to say, electrical generators having permanent field magnets.

The employment of magneto-generators has been disadvantageous for many purposes heretofore, owing to the impossibility of predetermining, with a sufficient approach to accuracy, the strength of the field magnets, it being extremely difficult, if not impossible, to magnetize a series of permanent magnets so that their pole-strengths will be alike. Hence, even when new there is a wide variation in the output of different magnetos of the same type, due to the differences in strengths of their respective fields. Furthermore, owing to the gradual weakening of the permanent magnets with age, and the variation in the amount of such weakening, it is impossible to prepare tables of coefficients or factors applicable to all machines of the same type or even to any given machine. In short, the uncontrollable nature of the permanent magnets is such as to make magnetos useless for work requiring great precision or an exact regulation of the condition of the field. These disadvantages, while merely causing great annoyance and inconveniences in certain fields for the employment of magnetos, for example, in ignition systems, become insuperable bars to the extended use of magnetos in other fields, for example, in connection with measuring instruments and the like.

The object of my invention is to overcome these disadvantages and to provide a magneto-generator which can be readily manufactured on a commercial scale and yet may have its field strength adjusted to a nicety not only when first built, but at any time thereafter.

With this object in view my invention in its broadest sense comprises a generator having permanent field magnets and an adjustable magnetic shunt or short-circuit for said field magnets.

For the purpose of adjusting the reluctance of the magnetic shunt or short-circuit. either the cross-section of the iron or steel of the shunt, or the cross-section or length of its air gap, or the position of the shunt relative to the permanent magnets may be adjusted.

A further feature of my invention consists in making the magnetic short-circuit itself permanently magnetic and so arranging it that its own flux may either reinforce or oppose the flux of the permanent field magnets.

I will now describe some of the preferred specific embodiments of my invention in connection with the accompanying drawings, in which—

Figure 2:
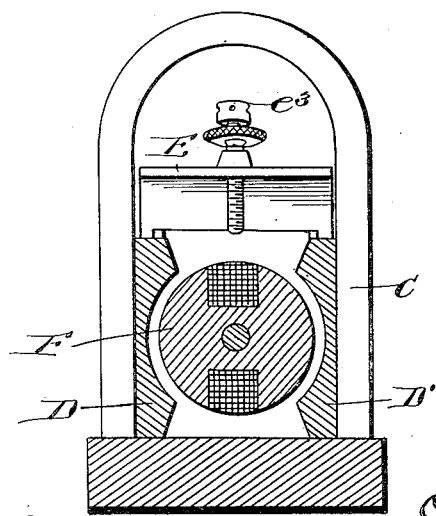

Figure 1 is a side elevation of a magneto-generator embodying one form of my invention, in which the adjustable short-circuiting device is of soft iron; Fig. 2 a section on the line 2—2 of Fig. 1; Fig. 3 a plan view partly in section of a magneto-generator embodying another form of my invention in which the magnetic short-circuiting device is a permanent steel magnet capable of being reversed, as more fully explained hereinafter; and Fig. 4 is a transverse section of the same.

Referring to the drawings, and more particularly to Figs. 1 and 2, A is the base, B, B', the standards for the armature shaft journals, C the permanent field magnets, D, D', the pole-pieces or shoes, and F the armature of a magneto-generator. The base A and the standards B, B', are of non-magnetic material. E is a short-circuiting device, in the present instance comprising a plate of soft iron hinged at one end to one of the standards, for example, the standard, B, the hinge connection being indicated at e. By means of this hinged connection the magnetic short-circuiting device may be swung down so as to lie upon and make a close contact with the upper surfaces of the pole-pieces D, D', or may be swung upward away from said pole-pieces to any desired extent. When in close contact with the upper surfaces of the pole-pieces, the said magnetic short-circuiting device forms such a good path for the magnetic flux of the permanent magnets that a large part, if not practically all the flux which would otherwise pass through the armature will pass through the magnetic short-circuit. When the said magnetic short-circuiting device is raised very slightly from the pole-pieces some of the magnetic flux still will cross from one pole-piece to the other through said magnetic short-circuiting device, the amount depending upon the extent of the air-gap between the pole-pieces and the said magnetic short-circuiting device, the remainder of the flux passing through the armature. The higher the magnetic short-circuiting device is raised from the pole-pieces, the less will be the amount of flux passing through the magnetic short-circuit and the greater the amount of flux passing through the armature. Hence by raising or lowering the magnetic short-circuit, the flux through the armature may be adjusted so as to give it the desired strength. Moreover, by reason of the variable angular relation of the short-circuiting device to the pole pieces, the reluctances at different parts of the pole pieces may be made to differ.

Suitable means may be provided for adjusting the magnetic short-circuiting device to or from the pole-pieces, and for holding the said device in any position to which it is adjusted. In the present example, this adjusting means is as follows: The magnetic short-circuiting device is provided with a boss or enlargement $e'$ through which is threaded an adjusting screw $e^2$ whose lower end rests on the top of the standard B', the said screw having a head $e^3$ preferably provided with pin-holes into which a pin may be inserted for turning the screw, whereby the magnetic short-circuiting device is raised or lowered. In order to prevent the accidental rotation of the screw, a lock-nut $e^4$ is provided.

It is particularly to be noted that in the device just described, the short-circuiting device is arranged on that side of the pole-pieces most remote from the ends of the field-magnets, thus insuring greater efficiency of the short-circuiting device than if it were at the ends of the field magnets, because in the latter position the magnetic circuit through the short-circuiting device is longer and therefore the magnetic leakage from limb to limb of the permanent magnets is greater than when the magnetic short-circuiting device is arranged as shown.

In Figs. 3 and 4 I have illustrated a modified form of the invention in which the reluctance of the magnetic shunt is adjusted by varying the cross-sectional area of the magnetic material in the shunt. In this construction the pole-pieces $D^2$, $D^3$, are provided on their upper faces with grooved ribs $d^2$, $d^3$, which as shown in Fig. 3 do not extend the entire length of said pole pieces; and between these ribs is mounted a longitudinally slidable plate E' of magnetic material having tongues sliding in the grooves of the ribs. Beneath this plate E' is a zinc plate G which forms a protective cover for the armature F', and when the plate E' is slid into the machine to its full extent, as shown in the drawings, it offers a good path for the passage of the magnetic flux from one pole-piece to the other, but when drawn out, to its greatest extent, as indicated in dotted lines in Fig. 3, it offers a much smaller cross-section of magnetic material for the passage of the flux. Hence, by adjusting this plate in or out to the desired extent, the cross-sectional area of the magnetic material included in the magnetic shunt may be varied as desired to accomplish the intended result. For the purpose of holding the said plate in any position to which it may be adjusted, any suitable means may be provided. In the present example this means may be as follows: The plate E' is provided with a slot as indicated at $E^5$, Fig. 3, and through this projects a thumb-screw $e^6$, which is threaded into a bridge-piece, H, Fig. 4, of non-magnetic material.

In the form of invention just described may be employed a permanent magnet of steel, for example, whose poles are at the sides, as indicated by the signs plus (+) and minus (—), Fig. 4. Then the effect of the shunt on the field of the generator coils may be modified to a greater extent than with the ordinary iron plate, because in addition to the adjustment of the plate in or out, the said plate may be reversed, either by turning it end for end, or by turning it upside down, whereby the direction of the flux of the shunt plate may be the same as that of the permanent magnets or opposite thereto, so that the said flux of the shunt plate will either reinforce the field due to the permanent magnets, or oppose and thereby weaken the same.

It will be clear from the foregoing that by my invention it becomes possible to manufacture commercially magneto-generators having fields of predetermined strengths, thus overcoming the disadvantages heretofore explained. Also by my invention magnetos become practical for use in measuring systems, whereby all the advantages of the simplicity, durability and reliability of such machines become available for such systems. Such generators become particularly desirable in counting revolutions of a working shaft, such as a ship's propeller shaft, the driving shaft of an engine, etc. To perform such work, the generator may be mounted directly on the shaft or may be geared thereto and is connected to a galvanometer or ammeter which will be marked with readings indicating the number of revolutions of a shaft in a given unit of time instead of the usual readings denoting strength of current.

Having thus fully described my invention, what I claim is:—

1. In a magneto-generator, the combination, with a permanent field-magnet, and an armature, of a reversible polarized magnetic short-circuiting device arranged to short-circuit the flux through said armature.

2. In a magneto-generator, the combination, with a permanent field-magnet having pole-pieces, and an armature between said pole-pieces, of a reversible polarized magnetic short-circuiting device arranged to be adjusted to vary the reluctance of the magnetic short-circuit.

3. In a magneto-generator, the combination, with a permanent field-magnet, and a continuously rotatable armature coil in the field of said permanent magnet, of a plate longitudinally adjustable between the limbs of said field-magnet, and means for holding said plate in any desired position.

4. In a magneto-generator, the combination, with a permanent field-magnet, and an armature coil in the field of said permanent magnet, of a polarized plate longitudinally adjustable between the limbs of said field-magnet, and means for holding said plate in any desired position.

5. In a magneto-generator, the combination, with a permanent field magnet having poles, and a continuously rotatable armature coil in the field of said permanent magnet, of a magnetic short-circuiting device arranged transversely to the direction of the flux and parallel to the axis of the armature, said magnetic short-circuiting device being adjustable in the direction of the axis of the armature to vary the reluctance of the magnetic shunt circuit to standardize the circuit through the armature, and means for securing said short circuiting device in adjusted position.

6. In a magneto-generator, the combination, with a plurality of permanent field-magnets, a pair of pole-pieces, common to all the said field magnets, and an armature rotatably mounted between said pole-pieces, of a magnetic shunt device for shunting the field flux from the armature, means for adjusting said magnetic shunt device so as to give different reluctances at different parts of the gap between the pole-pieces to standardize the flux through the armature and means for securing the shunt device in adjusted position.

7. In a magneto-generator, the combination, with a plurality of permanent field-magnets, a pair of pole-pieces common to all of said field-magnets, and an armature rotatably mounted between said pole-pieces, of a magnetic shunt device, arranged between the pair of pole-pieces and the yoke of the magnet, and means for adjusting and holding said magnetic shunt device in different relations to the pole-pieces whereby the flux through said pole-pieces may be differently short-circuited at different points, and the flux through the armature standardized.

8. In a magneto-generator, the combination, with a plurality of permanent field magnets, and an armature coil in the field of all of said magnets, of means for shunting the flux of said magnets from the armature coil, to unequal extents for the respective field magnets to standardize the flux through the armature.

9. In a magneto generator, the combination, with a plurality of permanent field magnets assembled in axial alinement and a rotatable armature in the field of said magnets, of a magnetic shunt device movable substantially axially of the assembled magnets to vary the flux between the poles of said magnets.

In witness whereof I hereunto affix my signature in the presence of two witnesses.

OTTO H. H. HEINS.

Witnesses:
ROGER B. WHITMAN,
A. H. BARTSCH.